United States Patent [19]

Reik

[11] Patent Number: 5,125,872
[45] Date of Patent: Jun. 30, 1992

[54] APPARATUS FOR DAMPING TORSIONAL VIBRATIONS WITH A SLIP CLUTCH BETWEEN INPUT AND OUTPUT MEMBERS

[75] Inventor: Wolfgang Reik, Bühl, Fed. Rep. of Germany

[73] Assignee: Luk Lamellen und Kupplungsbau GmbH, Bühl, Fed. Rep. of Germany

[21] Appl. No.: 630,212

[22] Filed: Dec. 19, 1990

[30] Foreign Application Priority Data

Dec. 21, 1989 [DE] Fed. Rep. of Germany ....... 3942321

[51] Int. Cl.⁵ .............................................. F16D 3/14
[52] U.S. Cl. ........................................ 464/67; 464/68; 74/574
[58] Field of Search ............................. 464/68, 66, 67; 192/106.2; 72/574

[56] References Cited

U.S. PATENT DOCUMENTS

| | | | |
|---|---|---|---|
| 4,138,003 | 2/1979 | Malloy | 464/64 X |
| 4,743,217 | 5/1988 | Tojima et al. | 192/106.2 X |
| 4,816,006 | 3/1989 | Friedmann | 464/67 |
| 4,884,996 | 12/1989 | Schmitt et al. | 464/66 |
| 4,904,225 | 2/1990 | Wörner et al. | 192/106.2 X |
| 4,944,712 | 7/1990 | Wörner et al. | 464/67 |
| 4,946,420 | 8/1990 | Jäckel | 464/7 |
| 4,961,487 | 10/1990 | Langeneckert | 192/106.2 |

FOREIGN PATENT DOCUMENTS 3721711 1/1988 Fed. Rep. of Germany .

Primary Examiner—Daniel P. Stodola
Assistant Examiner—Tony A. Gayoso
Attorney, Agent, or Firm—Peter K. Kontler

[57] ABSTRACT

That flywheel of a torsional vibration damping apparatus which is connected to the crankshaft of an internal combustion engine in a motor vehicle has a concentric annular lubricant-containing compartment for a relatively small number of elongated arcuate coil springs which bear against the teeth of a flange secured to a second flywheel which is coaxial with the first wheel and carries a friction clutch. The latter can be engaged to transmit torque from the second flywheel to the input element of a variable-speed transmission in the power train of the motor vehicle. The compartment of the first flywheel is lined by resilient shells which are installed in stressed condition and at least substantially surround the coil springs. The shells have integral abutments for the end portions of the springs, or the abutments are fixed to or alternate with arcuate portions of the shells. When the magnitude of torque which is transmitted by the first flywheel exceeds a preselected value, the first flywheel slips relative to the shells to thus prevent the transmission of torque peaks or surges to the second flywheel.

12 Claims, 2 Drawing Sheets

1

APPARATUS FOR DAMPING TORSIONAL VIBRATIONS WITH A SLIP CLUTCH BETWEEN INPUT AND OUTPUT MEMBERS

BACKGROUND OF THE INVENTION

The invention relates to vibration damping apparatus in general, and more particularly to improvements in apparatus for damping torsional vibrations, for example, between the engine and the wheels of a motor vehicle, especially between the crankshaft of the engine and the input element of the variable-speed transmission in a motor vehicle.

It is known to provide a torsional vibration damping apparatus with a rotary input member (e.g., a flywheel which is affixed to the crankshaft of the engine in a motor vehicle), a rotary output member which is coaxial with the input member and can include a second flywheel which cooperates with a pressure plate of a friction clutch to transmit torque to the input element of the transmission when the clutch is engaged, and at least one damper operating between the two flywheels and including energy storing elements acting in the circumferential direction of an annular chamber which is defined by one of the flywheels, e.g., by the first flywheel. The other flywheel then comprises sections which extend into the chamber and engage the ends of the energy storing elements. The one flywheel is provided with means for supporting the energy storing elements so that each energy storing element reacts against the respective supporting means and bears against the respective section when the first flywheel turns relative to the second flywheel, and that each energy storing element reacts against the respective section and bears against the respective supporting means when the second flywheel turns relative to the first flywheel. Reference may be had, for example, to published German patent application No. 37 21 711. The supporting means which are disclosed in this German patent application can constitute discrete stops which are affixed to walls forming part of the first flywheel and defining the annular chamber, or the supporting means can constitute stops in the form of integral projections on such walls. Reference may also be had to commonly owned U.S. Pats. Nos. 4,816,006 and 4,946,420 which disclose flywheels one of which has a lubricant-containing annular chamber for coil springs and the radially outer portions of the coil springs bear against inserts which are installed in the radially outermost portion of the chamber.

OBJECTS OF THE INVENTION

An object of the invention is to provide torsional vibration damping apparatus with novel and improved supports for the energy storing elements in the annular chamber of one of the input and output members.

Another object of the invention is to provide a relatively simple, compact and inexpensive apparatus which can be utilized to damp torsional vibrations in the power train of a motor vehicle.

A further object of the invention is to provide a torsional vibration damping apparatus which comprises a relatively small number of discrete parts.

An additional object of the invention is to provide a torsional vibration damping apparatus which is constructed and assembled in such a way that its useful life is longer than that of heretofore known apparatus.

Still another object of the invention is to provide a torsional vibration damping apparatus wherein the means for supporting the energy storing elements in the chamber of one of the input and output members is simpler, more compact and less expensive than heretofore known supporting means.

A further object of the invention is to provide a power train which embodies the above outlined torsional vibration damping apparatus.

An additional object of the invention is to provide a novel and improved torque transmitting connection between the engine and the variable-speed transmission of a motor vehicle.

Another object of the invention is to provide a torsional vibration damping apparatus with a built-in automatic slip clutch or torque-limiting clutch which protects certain component parts from peaks or surges of torque.

A further object of the invention is to provide a slip clutch or torque-limiting clutch which does not occupy any additional space and is assembled of components which can perform additional desirable and important functions in the above outlined torsional vibration damping apparatus.

SUMMARY OF THE INVENTION

The invention is embodied in an apparatus for damping torsional vibrations, e.g., in the power train between the engine and the wheels of a motor vehicle, particularly between the crankshaft of the engine and a friction clutch which transmits torque to an input element of a variable-speed transmission in a motor vehicle. The improved apparatus comprises coaxial rotary input and output members, an annular chamber which is defined by one of these members and is adjacent the other member (i.e., the chamber is disposed between the input and output members), a plurality of neighboring energy storing elements (e.g., in the form of elongated arcuate coil springs) disposed in and acting in the circumferential direction of the chamber, sections provided on the other member and adjacent the end portions of the energy storing elements in the chamber (the arrangement is preferably such that the sections of the other member alternate with the energy storing elements in the circumferential direction of the chamber), and means for supporting the energy storing elements in the chamber. In accordance with a feature of the invention, the supporting means comprises one or more stressed resilient elements in force-locking and/or frictional engagement with the one member. Each resilient element can overlie a portion of the internal surface which is provided on the one member and surrounds the chamber for the energy storing elements.

The arrangement is or can be such that each resilient element has a cross-sectional area extending along an arc of less than 180 degrees in a plane including the common axis of the input and output members and intersecting the chamber in the one member. The cross-sectional area of each resilient element can resemble or constitute an arc of a circle.

The supporting means for the energy storing elements can further comprise abutments which alternate with the energy storing elements in the circumferential direction of the chamber. Such abutments can form integral parts of the resilient element or elements, and each resilient element can comprise an abutment between each pair of neighboring energy storing elements. The abutments can define passages for the sections of the other member. In accordance with a presently preferred embodiment, the one member comprises a first flywheel (e.g., a flywheel which can be affixed to the crankshaft of the internal combustion engine in a motor vehicle, and the other member comprises a second flywheel which can transmit torque to the clutch plate of a friction clutch when the clutch is engaged so that its clutch plate can transmit torque to the input element of a variable-speed transmission in the motor vehicle. The other member preferably further comprises a substantially flange-like member which is affixed to the second flywheel and includes the aforementioned sections, e.g., sections in the form of radially outwardly extending teeth which alternate with the energy storing elements in the chamber of the one member.

In accordance with a presently preferred embodiment, the supporting means comprises two resilient elements each of which includes an annular shell having a convex outer side at the internal surface of the one member and a concave inner side adjacent the energy storing elements. The shells are or can be substantially mirror images of each other with reference to a plane which is normal to the common axis of the input and output members. The shells can jointly surround at least the major portions of the energy storing elements in the chamber but provide room for the sections of the other member so that such sections can extend into the chamber to alternate with the energy storing elements. Each energy storing element can extend along an arc of close to 90 degrees. The number of such energy storing elements can but need not exceed four.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
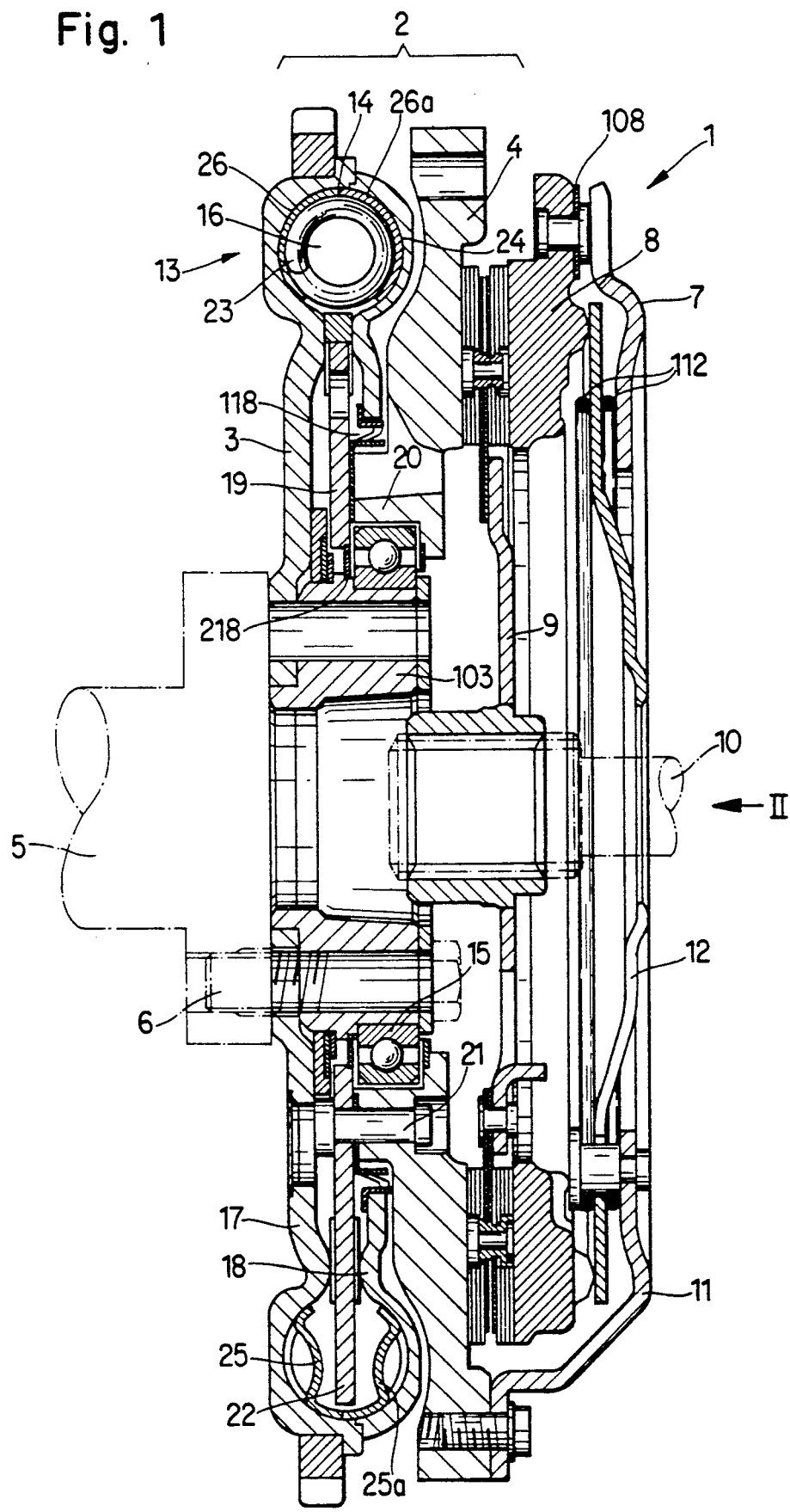
FIG. 1 is an axial sectional view of a torsional vibration damping apparatus which embodies one form of the invention and wherein the means for supporting the energy storing elements in the chamber of one of the input and output members comprises two annular shells which are mirror images of each other.
Figure 2:
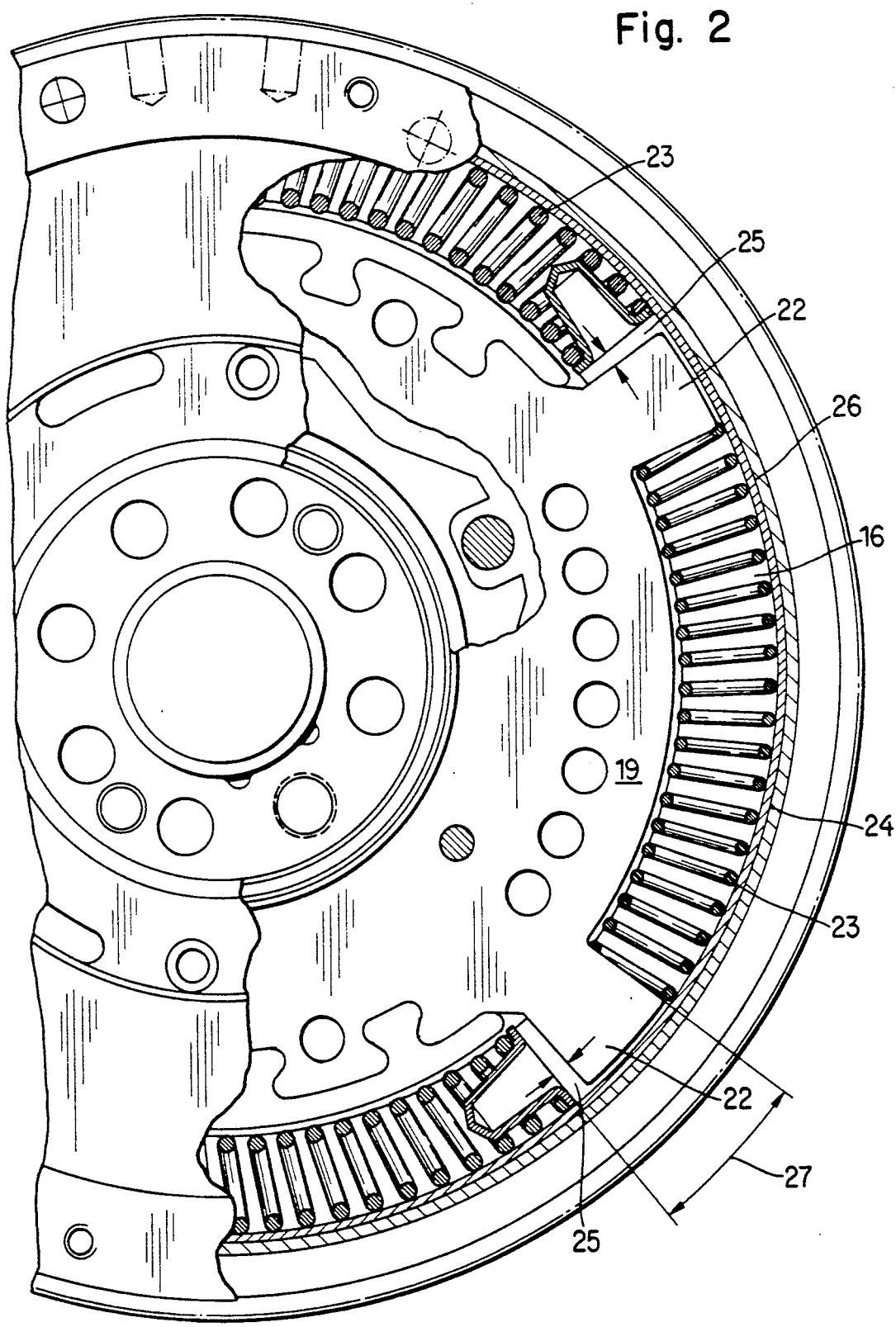
FIG. 2 is an end elevational view as seen in the direction of arrow II in FIG. 1, with the friction clutch omitted and with portions of the input and output members broken away.

The torsional vibration damping apparatus 1 which is shown in FIGS. 1 and 2 comprises a composite flywheel 2 having an input member 3 and an output member 4, 19. The input member 3 is a flywheel which is bolted (as at 6) to the crankshaft 5 of an internal combustion engine (refer, for example, to commonly owned U.S. Pat. Nos. 4,611,701 and 4,732,250), and the output member comprises a flywheel 4 which is coaxial with and is rotatable relative to the flywheel 3 and a substantially flange-like or disc-shaped member 19 which is riveted to the flywheel 4 (as at 21) and has radially outwardly extending sections or teeth 22 in an annular chamber 16 of the flywheel 3. The chamber 16 is located between the flywheels 3, 4 and is defined by two radially extending walls 17, 18 of the flywheel 3.

The flywheel 4 carries a friction clutch 7 which can be engaged to transmit torque from the flange-like member 19 (hereinafter called flange for short) to the input element or shaft 10 of a variable-speed transmission (reference may be had again to the commonly owned U.S. Pat. Nos. 4,611,701 and 4,732,250). The friction clutch 7 comprises a rotary housing 11 which is bolted or riveted to the flywheel 4, a pressure plate 8 which is disposed between the housing 11 and the flywheel 4, a diaphragm spring 12 which is tiltable between two ring-shaped seats 112 at the inner side of the housing 11 to normally bias the pressure plate 8 toward the flywheel 4, leaf springs 108 which transmit torque from the housing 11 to the pressure plate 8 but enable the pressure plate to move axially of the flywheels 3, 4, and a clutch plate 9 which is clamped between and is driven by the flywheel 4 and pressure plate 8 when the clutch 7 is engaged. The hub of the clutch plate 9 is affixed to the input shaft 10 of the variable-speed transmission. The flywheel 3 has an axial protuberance 103 which is surrounded by an antifriction ball bearing 15 in a central recess defined by a hub 20 of the flywheel 4.

The device 13 which serves to damp torsional vibrations between the crankshaft 5 and the input element 10 (and more specifically between the flywheels 3 and 4) comprises a set of four energy storing elements in the form of elongated arcuate coil springs 23 in the annular radially outer portion or compartment 24 of the chamber 16 between the walls 17, 18 of the flywheel 3. The radially outermost portion of the annular compartment 24 is fluid-tightly sealed by the radially outermost portions of the walls 17, 18, and the apparatus 1 further comprises a ring-shaped seal 118 between the radially innermost portion of the wall 18 and the flywheel 4. An additional seal 218 prevents escape of a viscous fluid medium (such as oil or another suitable lubricant) from the chamber 16 by way of the antifriction ball bearing 15. The viscous fluid medium at least partially fills the chamber 16, e.g., to an extent which is necessary to ensure that the coil springs 23 are at least partially immersed in fluid medium when the flywheel 3 rotates so that the supply of viscous fluid medium is acted upon by centrifugal force. The walls 17, 18 of the flywheel 3 can be made of a metallic sheet material, the same as the flange 19 of the output member of the apparatus 1 (i.e., of the damper 13). The rivets 21 connect the radially inner portion of the flange 19 to the hub 20 of the flywheel 4.

The sections or teeth 22 of the flange 19 extend radially outwardly into the chamber 16 and alternate with the coil springs 23 of the damper 13. When the crankshaft 5 drives the flywheel 3, the springs 23 react against the integral abutments or stops 25, 25a of supporting means 26+26a in the chamber 16 and bear against the respective sections 22 of the flange 19 which transmits torque to the flywheel 4 and hence to the cover 11 and pressure plate 8 of the friction clutch 7. If the vehicle which embodies the apparatus 1 is coasting and the clutch 7 is engaged, the input element 10 of the change-speed transmission can transmit torque to the flywheel 4 which, in turn, rotates the flywheel 3. At such time, the springs 23 react against the respective sections 22 of the flange 19 and bear against the respective pairs of abutments or stops 25, 25a on the annular shell-shaped resilient elements 26, 26a of the supporting means. The springs 23 are received in the annular compartment 24 which constitutes the radially outermost portion of the chamber 16 and is bounded by the internal surfaces of the walls 17 and 18. Such internal surfaces are partially overlapped by the convex external surfaces of the shells 26 and 26a which are, or can be, mirror symmetrical to each other with reference to a plane extending at right angles to the common axis of the flywheels 3, 4 and antifriction bearing 15 and preferably halving the flange 19. The annular compartment 24 of the chamber 30 is composed of two halves each of which constitutes a circumferentially complete groove in the inner side of one of the walls 17 and 18. These grooves are or can be mirror images of each other with reference to the aforementioned symmetry plane between the shells 26 and 26a of the supporting means for the springs 23 in the compartment 24.

The abutments or stops 25, 25a of the apparatus 1 are integral parts of the respective shells 26, 26a and can be obtained by deforming the corresponding portions of the shells so that the abutments extend into the compartment 24 of the chamber 16 and alternate with the springs 23. Each abutment 25 confronts but is spaced apart (axially of the flywheels 3, 4) from one of the abutments 25a so that such pairs of abutments define radially extending clearances for the sections or teeth 22 of the flange 19 (see the lower portion of FIG. 1). The shells 26, 26a are made of resilient sheet material (e.g., a suitable metallic or plastic material) and their concave inner sides closely follow the adjacent portions of the springs 23. The shells 26, 26a surround substantial portions of the springs 23, 23a and are installed in the compartment 24 in stressed condition so that they bear against the adjacent portions of internal surfaces of the respective walls 17 and 18, i.e., against the flywheel 3. The arrangement is preferably such that the shells 26, 26a are stressed in the axial as well as in the radial direction of the composite flywheel 2 when they are properly installed in the compartment 24 of the chamber 16; this ensures that the external surfaces of the shells 26, 26a are in reliable force-locking frictional engagement with the internal surfaces of the walls 17 and 18 when such walls are properly connected to each other by bolts, by welding and/or in any other suitable way.

The extent of frictional or force-locking engagement between the shells 26, 26a and the flywheel 3 is preferably selected in such a way that it exceeds the maximum nominal torque which can be transmitted by the engine including or driving the crankshaft 5. The force-locking or frictional engagement between the supporting means including the shells 26, 26a and the flywheel 3 preferably exceeds 1.2 times the maximum nominal torque of the engine. In other words, the magnitude of torque which can be transmitted from the flywheel 3 to the supporting means 26+26a is preferably not less than 1.2 times the nominal torque of the engine which drives the crankshaft 5.

The stressed shells 26, 26a preferably abut and bear against each other in the aforementioned symmetry plane (as at 14 in FIG. 1), and each of these shells preferably overlies the entire internal surface of that portion of the respective wall (17, 18) which surrounds the annular compartment 24 of the chamber 16.

The integral inwardly extending abutments or stops 25, 25a of the shells 26, 26a can be replaced with separately produced abutments or stops which are affixed to the respective shells. Furthermore, though each of the two shells 26a, 26b preferably forms a complete ring, each of these shells can be assembled of two or more arcuate parts which are disposed end to end to jointly form an annular multiple-part shell.

It is further within the purview of the invention to provide the damper 13 with discrete abutments which are functional equivalents of the abutments 25, 25a but are not integral parts of and are not affixed to the shells 26, 26a. Thus, each of the two shells 26, 26a can be interrupted at 27 (FIG. 2) between the end portions of each pair of neighboring springs 23, and the thus obtained spaces can receive discrete (preferably resilient and preferably prestressed) abutments or stops which perform the functions of the illustrated abutments 25, 25a and are spaced apart from each other in the axial direction of the composite flywheel 2 in order to provide radially extending clearances or gaps for the sections or teeth 22 of the flange 19.

FIG. 1 shows that the surfaces bounding the compartment 24 at least substantially but preferably closely follow the convex external surfaces of the shells 26, 26a and that the internal surfaces of these shells at least substantially but preferably closely follow the outlines of the adjacent springs 23. In other words, the concave internal surfaces of the shells 26, 26a can be said to constitute supports and guide means for the adjacent springs 23, at least while the flywheel 3 rotates and the springs 23 are acted upon by centrifugal force. The radially outermost portions of the arcuate elongated springs 23 will bear against the adjacent portions of internal surfaces of the shells 26, 26a at least when the flywheel 3 is rotated at a speed which is sufficiently high to impart to the springs 23 a sufficient tendency to move radially outwardly under the action of centrifugal force. However, this does not preclude such mounting and dimensioning of the springs 23 that the external surfaces of these springs bear against the adjacent portions of the shells 26, 26a (at least in the radially outer portion of the compartment 24, even when the flywheel 3 does not rotate.

The shells 26, 26a are preferably made of a high-quality steel or other suitable highly wear-resistant material (or they may be coated with films or layers of highly wear-resistant material). This is desirable and advantageous because the resistance of the shells 26, 26a to wear in response to engagement with the springs 23 ensures that the useful life of the shells is long. In addition, the shells 26, 26a prevent direct contact between the springs 23 and the walls 17, 18 of the flywheel 3. As a rule, or at least in many instances, the walls 17, 18 are (or can be) made of lower-quality sheet material or can constitute castings of iron or other suitable material.

The walls 17, 18 of the flywheel 3 and the shells 26, 26a can be said to constitute component parts of a slip clutch or torque limiting clutch which limits the magnitude of torque capable of being transmitted between the crankshaft 5 and the input element 10. Thus, the force-locking or frictional engagement between the external surfaces of the shells 26, 26a and the adjacent internal surfaces of the walls 17, 18 can be selected with a view to ensure that the shells begin to slide relative to the walls and/or vice versa when the magnitude of the torque to be transmitted by the damper 13 reaches a preselected value. The just described slip clutch or torque limiting clutch does not occupy any additional space and does not require the utilization of any additional parts since the walls 17, 18 are constituents of the flywheel 3 and the shells 26, 26a are constituents of the damper 13 and/or of the means for reducing wear upon the walls 17, 18. For example, the slip clutch including the walls 17, 18 and the shells 26, 26a can be designed to permit the shells and the flywheel 3 to turn relative to each other when the transmitted torque develops peaks or surges which should not be transmitted to the flywheel 4 and its flange 19. It can be said that the just discussed slip clutch (including the walls 17, 18 of the flywheel 3 and the shells 26, 26a) acts as a filter which prevents transmission of certain torques (exceeding the nominal torque of the engine) from the crankshaft 5 to the transmission including the input element 10.

The improved slip clutch or torque limiting clutch includes the walls 17, 18 (i.e., those portions of the flywheel 3 which are needed to define the chamber 16 for the springs 23 of the damper 13) and the shells 26, 26a which are confined in the compartment 24 of the chamber 16. Thus, there is no need for any additional parts (even for a single additional part) for the purpose of incorporating in the improved torsional vibration damping apparatus a slip clutch or torque limiting clutch for the aforediscussed purpose of preventing transmission of peaks or surges of torque to the input element 10 of the variable-speed transmission.

The exact magnitude of torque which should not be transmitted to the flywheel 4 and its flange 19 can be accurately selected by appropriate selection of the finish of the internal surfaces of the walls 17, 18 and of the adjacent external surfaces of the shells 26, 26a. Such torque can also be influenced by appropriate selection of friction coefficients of the materials of the walls 17, 18 and shells 26, 26a, by initial stressing of the resilient shells in the compartment 24 and/or by the provision of friction enhancing or friction reducing films or layers between the shells 26, 26a on the one hand and the walls 17, 18 on the other hand. In other words, the shells 26, 26a can but need not bear directly against the adjacent internal surfaces of the walls 17 and 18, depending upon whether the manufacturer of the improved torsional vibration damping apparatus considers it advisable to coat the internal surfaces of the walls and/or the external surfaces of the shells with layers or films of a friction reducing or friction-enhancing material. As a rule, the layers or films will be thin or extremely thin and, if used, will be applied to the walls 17, 18 or to the shells 26, 26a (even though the application of films to the shells as well as to the walls is not excluded).

As already mentioned above, the shells 26, 26a can constitute circumferentially complete annuli which are mirror symmetrical to each other. It is also possible to assemble a composite shell of arcuate tubular portions with slots for sections 22 of the flange 19 or without such slots if each tubular portion extends only around a spring 23 but not across the adjacent spaces 27. The tubular portions are resiliently deformable in the radial direction of the flywheel 3 and also in the axial direction if their curvature in the circumferential direction of the compartment 24 at least approximates the curvature of the composite internal surface (of the walls 17, 18) surrounding the compartment 24.

It is presently preferred to employ supporting means with two mirror symmetrical shells 26, 26a which abut each other (or can be affixed to each other) at 24. An advantage of the illustrated shells 26, 26a is that they can effectively protect the walls 17, 18 from excessive wear even if the walls are made of a material which is incapable of resisting extensive wear. The reason is that the shells 26, 26a will slide relative to the walls 17, 18 and/or vice versa only when such parts act as a slip clutch or torque limiting clutch for the purpose of preventing the transmission of peaks or surges of torque to the flywheel 4 and its flange 19.

If the abutments 25, 25a for the end portions of the springs 23 are separately produced parts, they are or can be form-lockingly connected with the adjacent arcuate portions of the shells 26 and 26a (as considered in the circumferential direction of the flywheel 3 and its compartment 24).

The improved torsional vibration damping apparatus can be used in the power train of motor vehicles, not only in the illustrated manner (between the crankshaft of an internal combustion engine and a friction clutch which transmits torque to the change-speed transmission) but also in other systems where torsional vibrations should be damped for one or more reasons. Examples of such other systems are clutch plates (reference may be had, e.g., to commonly owned U.S. Pat. Nos. 4,700,821 and 4,890,712), flywheels for torque converters (reference may be had to commonly owned U.S. Pat. No. 4,785,924) and many others.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for damping torsional vibrations, comprising coaxial rotary input and output members, one of said members having an annular chamber adjacent the other of said members and said members being angularly movable relative to each other; a plurality of neighboring energy storing elements disposed in and acting in the circumferential direction of said chamber to transmit torque between said members, said elements having end portions and said other member including sections adjacent the end portions of said elements; and means for supporting the energy storing elements in said chamber, including at least one stressed resilient element in at least one of force-locking and frictional engagement with said one member to stress said energy storing elements in response to angular displacement of said members relative to each other, said one member and said at least one resilient element being movable relative to each other in the circumferential direction of said chamber when the torque which is transmitted by said energy storing elements reaches a preselected value.

2. The apparatus of claim 1, wherein said one member has an internal surface surrounding said annular chamber and said at least one resilient element overlies a portion of said internal surface.

3. The apparatus of claim 2, wherein said supporting means comprises two resilient elements and each of said resilient elements has a cross-sectional outline extending along an arc of less than 180 degrees in a plane including the common axis of said members and intersecting said chamber.

4. The apparatus of claim 1, wherein said at least one resilient element has a cross-sectional outline which at least resembles an arc of a circle.

5. The apparatus of claim 1, wherein said supporting means further comprises abutments alternating with said energy storing elements in the circumferential direction of said chamber.

6. The apparatus of claim 1, wherein said one member has an internal surface surrounding said chamber and said supporting means includes two resilient elements comprising annular shells each having a convex outer side adjacent said internal surface and a concave inner side adjacent said energy storing elements.

7. The apparatus of claim 6, wherein said shells are substantially mirror images of each other with reference to a plane which is normal to the common axis of said members.

8. The apparatus of claim 6, wherein said shells jointly surround at least the major portions of said energy storing elements.

9. The apparatus of claim 1, wherein said supporting means further comprises abutments provided on said at least one resilient element and alternating with said energy storing elements.

10. The apparatus of claim 9, wherein said at least one resilient element comprises an abutment between each pair of neighboring energy storing elements.

11. The apparatus of claim 9, wherein said abutments define passages for said sections.

12. The apparatus of claim 1, wherein said one member comprises a first flywheel and said other member comprises a second flywheel and a substantially flange-like member affixed to said second flywheel, said sections forming part of said flange-like member.

* * * * *